Oct. 20, 1964 B. M. NOBLE 3,153,456
PLANT BED SHAPER
Filed March 6, 1963 3 Sheets-Sheet 1
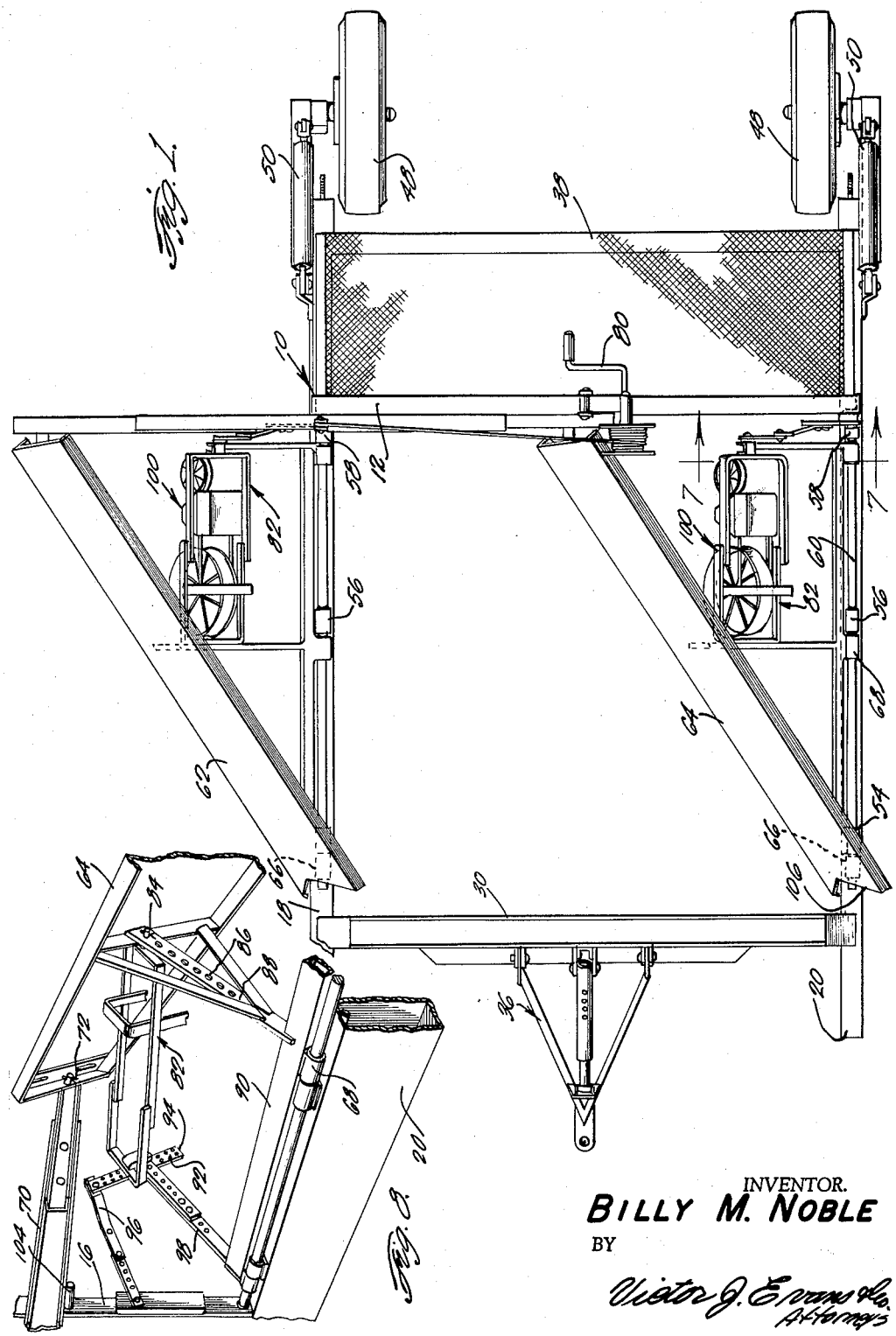
INVENTOR.
BILLY M. NOBLE
BY

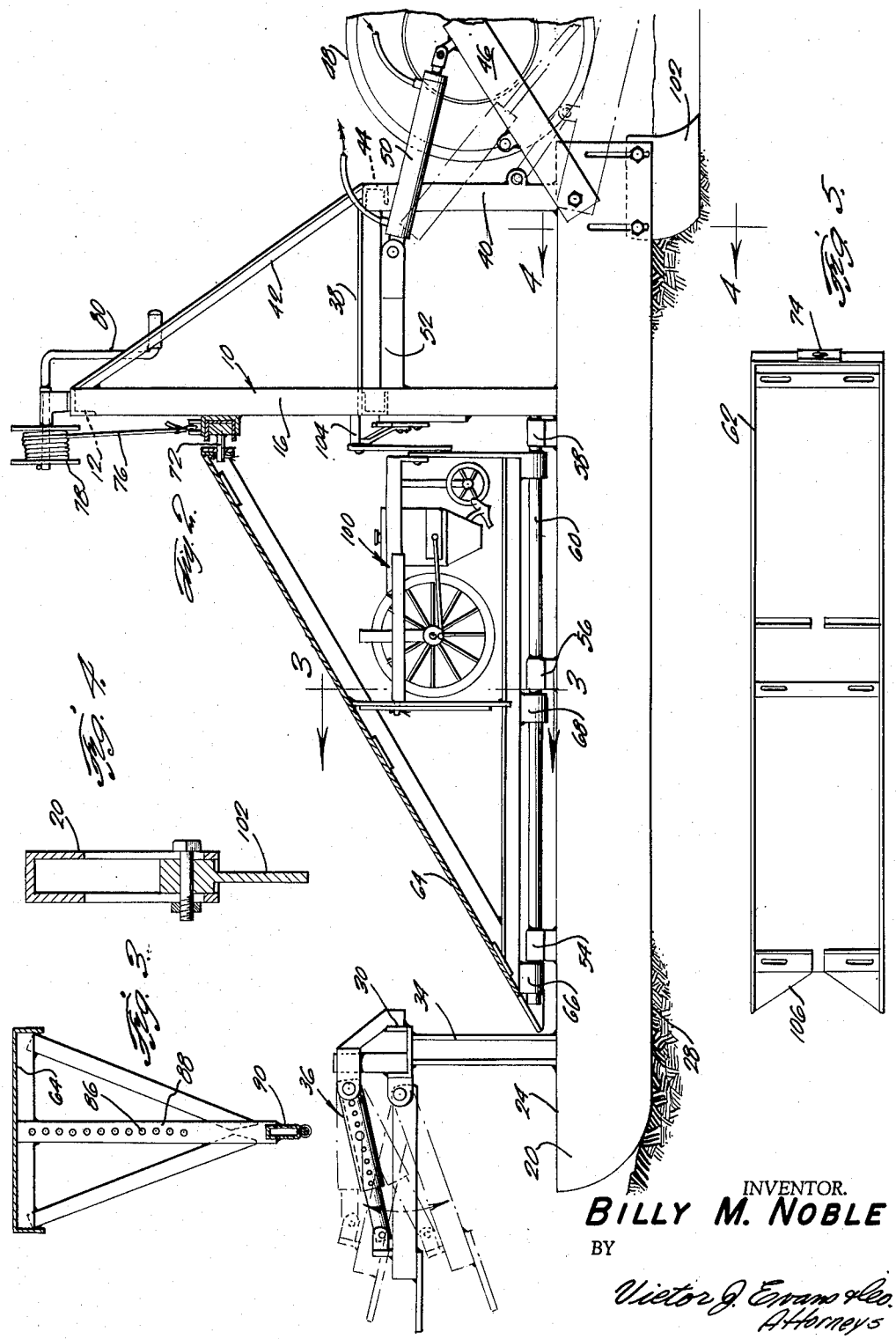

Oct. 20, 1964
B. M. NOBLE
3,153,456
PLANT BED SHAPER
Filed March 6, 1963
3 Sheets-Sheet 3
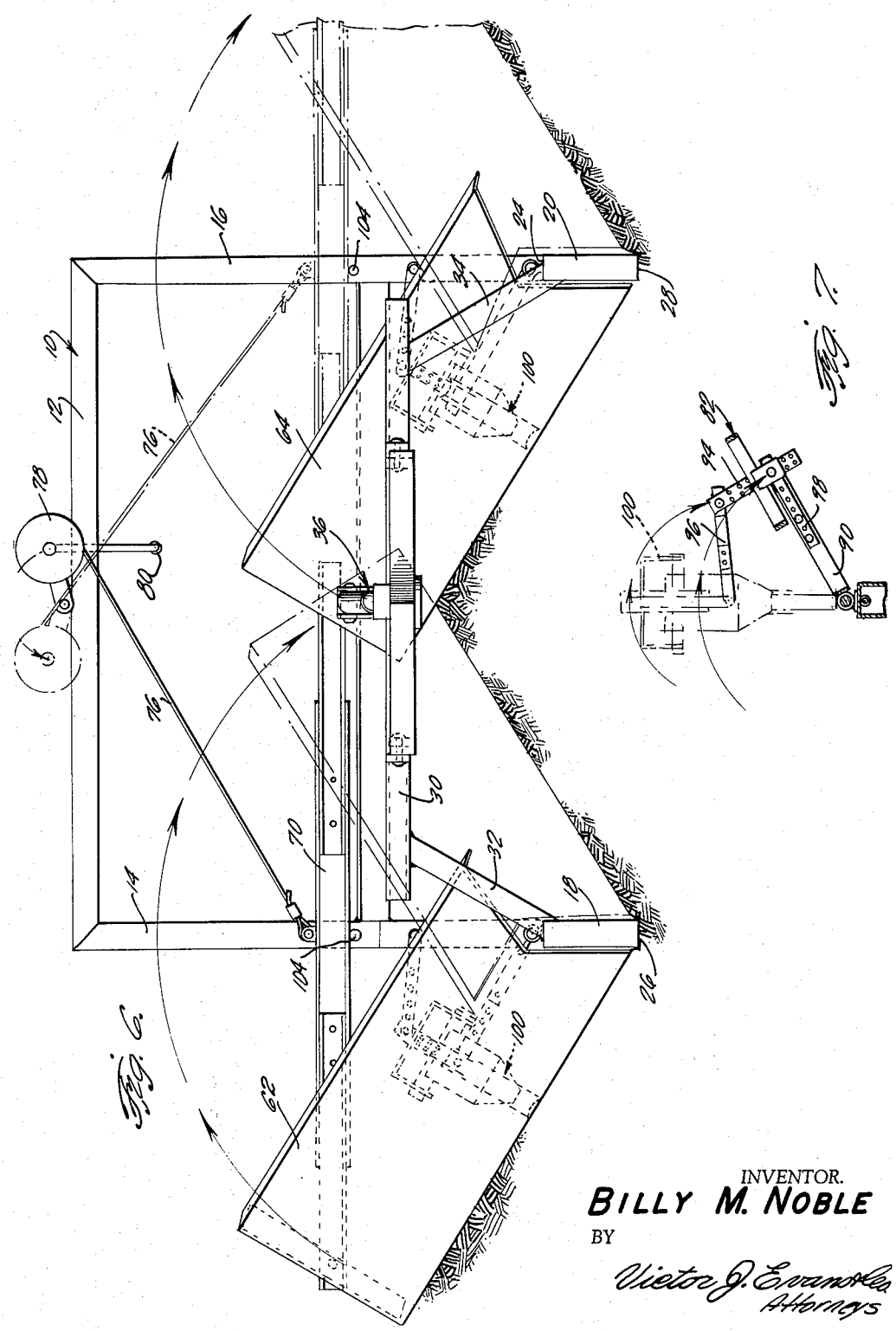
INVENTOR.
BILLY M. NOBLE
BY
Victor J. Evans & Co
Attorneys

United States Patent Office 3,153,456
Patented Oct. 20, 1964

3,153,456
PLANT BED SHAPER
Billy M. Noble, P.O. Box 862, N. State St.,
Somerton, Ariz.
Filed Mar. 6, 1963, Ser. No. 263,286
4 Claims. (Cl. 172—161)

The present invention relates to agricultural implements generally and in particular to a shaper for forming a plant bed.

An object of the present invention is to provide a machine or shaper for attachment to a towing vehicle for shaping a plant bed so that precise furrows are provided between raised bed rows, such furrows being adapted for the conduct of irrigation water over the area.

Another object of the present invention is to provide a plant bed shaper which may be employed to shape an angularly sloping plant bed of various angles, one which is instantly adjustable for sloping either to the right hand or to the left hand as the tractor drags the shapper over the ground surface, one which is sturdy in construction and having long life characteristics, and one which is economically feasible.

A further object of the present invention is to provide a plant bed shaper which has means for holding a seeding machine or planter in an erect condition behind the shaping blade, the blades being movable from the right hand to the left hand, and means being provided for carrying the seeding machine or planter along with the blade as it moves and still maintaining the seeding machine or planter in an erect condition.

These and other objects and advantages of the present invention will be fully apparent from the following description when taken in consideration with the annexed drawings, in which:

FIGURE 1 is a plan view of the shaper of the present invention,

FIGURE 2 is an elevational side view of the shaper showing one blade in section and at the top of its arc of swinging movement, FIGURE 3 is a view taken on the line 3—3 of FIGURE 2, FIGURE 4 is a view taken on the line 4—4 of FIGURE 2 and on an enlarged scale, FIGURE 5 is a plan view of one of the blades removed from the shaper, FIGURE 6 is an elevational view taken from the front of the shaper, the dotted line showings indicating the swinging movement of each of the ground working blades, FIGURE 7 is a view on an enlarged scale, taken on the line 7—7 of FIGURE 1, and, FIGURE 8 is a fragmentary perspective view showing the means for holding a planter adjacent one of the blades.

With reference to the drawings in detail in which like numerals indicate like parts throughout the several views, the reference numeral 10 designates an inverted U-shaped frame having a bight 12 and legs 14 and 16 depending from the ends of the bight 12.

The shaper includes a pair of horizontally disposed laterally spaced runners 18 and 20 having tops 22 and 24 and bottoms 26 and 28 respectively.

The bottoms 26 and 28 are adapted for sliding movement over the ground surface when the shaper is towed behind a towing vehicle.

A cross member 30 having legs 32 and 34 extends between the runners 18 and 20 and has the lower ends of its legs 32 and 34 welded to the runners 18 and 20 inwardly of and adjacent to the forward ends of the latter.

Hitch means, indicated generally by the reference numeral 36 is secured to the cross member 30 intermediate the ends thereof and is adapted for attachment to a towing vehicle such as a tractor. The hitch means is conventional and need not be further described.

A platform 38 extends rearwardly from the frame 10 and has its forward edge secured to the legs 14 and 16 of the frame 10, the rearward end of the platform 38 being supported upon uprights 40 which have their lower ends secured to the adjacent runners 18 and 20, only one upright being shown in FIGURE 2.

A brace 42 extends along each end of the platform 38 and has its upper end connected to the adjacent legs 14 and 16 and has its lower end secured by welding or other suitable means to the platform 38. A rear cross member 44, shown in dotted lines in FIGURE 2, extends across the rear end of the platform 38 and is fixedly secured to the upper edge 40.

An arm 46 is pivotally connected to each of the runners 18 and 20 and carries on its free end a wheel 48. A hydraulic cylinder assembly 50 connects each arm 46 to the adjacent side of the platform frame member 52 so that each wheel 48 may be moved upwardly or downwardly from a ground engaging position with the adjacent runner 18 or 20 out of engagement with the ground or to an elevated position as shown in FIGURE 2 in which the wheel 48 is carried by the adjacent runner.

Trunnions 54, 56, and 58 project upwardly from tops 22 and 24 of the respective runners 18 and 20. Journaled in the trunnions 54, 56, and 58 on each of the runners 18 and 20 is a shaft 60. A blade 62 is positioned adjacent the runner 18 and another blade 64 is positioned adjacent the runner 20.

The blades 62 and 64 are connected by means of other trunnions 66 and 68 to the shaft 60.

As shown in FIGURE 1, the blade 62 is exteriorly of the runners 18 and 20 while the blade 64 is positioned between the runners 18 and 20.

The shaft 60 and the respective trunnions connect the blade 62 to the top of the runner 18 for swinging movement from the full line position exteriorly of the runner 18 to a position between the runners 18 and 20 as shown in dotted lines in FIGURE 6. Similarly, the other shaft 60 and associated trunnions connect the blade 64 from movement from the position between the runners 18 and 20 to a position exteriorly of the runner 20 as shown in dotted lines in FIGURE 6.

Means is provided for simultaneously moving the blades between their positions and this means consists in a horizontally disposed bar 70 having one end pivotally connected to the rearward end of the blade 62 and having the other end pivotally connected to the rearward end of the blade 64.

As will be seen most clearly in FIGURES 2 and 8, a pin 72 projects outwardly from the bar 70 adjacent each end thereof and is received in a hole 74 provided in the adjacent blades 62, 64. One of the blades 62, is shown in detail in FIGURE 5 removed from the shaper.

In FIGURE 2 it will be seen that the blade 64 is in its position midway in the arch of its swinging movement from the position between the runners 18 and 20 to a position exteriorly of the runner 20.

Hand actuable means is provided for effecting the movement of the blades 62 and 64 simultaneously and this means consists in a cable 76 windable upon a drum 78, the drum 78 having a handle 80 and being mounted upon the frame bight 12.

Means is provided for holding in an upright or erect condition a planter adjacent each of the blades 62 and 64. This means is shown in detail in FIGURE 8 and consists in a rectangular frame 82 having its forward end provided with a pin 84 which is carried in any one of a series of holes 86 in a bar 88 which extends from the adjacent blade 62 or 64 to a beam 90 which carries the trunnions 66 and 68. The other end of the frame 82 is fixedly secured by conventional fastening elements such as bolts (not shown) in any pair of holes 92 in a flat strap member 94. The strap member 94 is pivotally connected to the free ends of arms 96 and 98 which have their other ends pivotally connected to the adjacent leg of the frame 10 and the beam 90, respectively.

The swinging movement of the frame 82 is shown most clearly in FIGURE 7 in which the dotted line indicates a conventional planter as at 100.

The planter 100 may be of any make or size and it is only necessary to vary the frame 82 to accommodate the planter to be used.

The planter includes a drive wheel which operates it when in rolling engagement with the ground as shown in dotted lines in FIGURE 6.

In the use of the shaper of the present invention, it is desired to plant the fruit or fruit seeds in the side of the hill or ridge which is shaped by the plant bed shaper of the present invention. The swinging movement of the blades 62 and 64 from one side to the other permits the operator to cut the furrows down through the field in one direction and to reverse them for coming back in the opposite direction so that the planters are always on one side of the furrows for reasons which are well known in the agricultural industry.

The device of the present invention permits shaping of the furrows so that irrigation may be efficiently employed to raise fruit or mellon crops with each plant at the most desirable place with respect to the top of the hill and the bottom of the furrow.

The platform 38 permits an operator to maintain the planters 100 in full supply of seeds or plants as the case may be.

At the end of each runner 18 and 20 adjacent the wheels 48 is a short blade 102 adjustably secured to the adjacent runner to hold the bed shaper blades 62 and 64 in line with the beds because of the side push on the blades 62 and 64.

Obviously, if the hills are not to be as sharply formed as shown in FIGURE 6, it is only necessary to provide pins 104 upon which the bar 70 rests when in the laid down position.

It will be noticed in FIGURES 1 and 5 that the forward end of each of the blades 62, 64 is notched, as at 106 in order that they fit snugly against the side of the adjacent runner 18, 20, as shown most clearly in FIGURE 6.

Further, the pivotal arrangement as shown in FIGURE 2 in dotted lines of the hitch means 36 gives flexibility to the plant bed shaper for traveling movement behind a tractor and the hitch means 36 may be attached to the elevating arms at the rearward end of a tractor so that the entire length of the runners may be lifted from the ground when the wheels 48 are depressed.

While only a single embodiment of the invention has been described and shown it is contemplated that numerous changes and modifications may be made in the invention to accommodate different uses and purposes without departing from the spirit of the invention as set forth in the appended claims.

What is claimed is:

1. In a plant bed shaper including a pair of horizontally disposed laterally spaced runners each having a bottom, the bottoms being adapted for sliding movement over a ground surface, a cross member connecting one of the adjacent ends of said runners together, and hitch means carried by said cross member for attachment to a towing vehicle, a first blade positioned at an angle to and adjacent one of said runners, a second blade positioned at a like angle to and adjacent the other of said runners, said first blade being positioned exteriorly of said pair of runners and said second blade being positioned between said one and other runners, and means connecting each of said first and second blades to the adjacent runner for swinging movement from the position in which said first blade is exteriorly of said pair of runners and said second blade is between said one and other runners to a position in which said first blade is between said one and other runners and said second blade is exteriorly of said pair of runners.

2. In a plant bed shaper including a pair of horizontally disposed laterally spaced runners each having a bottom, said pair of runners having forward ends and rearwards ends, the bottoms being adapted for sliding movement over a ground surface, a cross member connecting the forward ends of said runners together, and hitch means carried by said cross member for attachment to a towing vehicle, a first blade diverging outwardly from the forward end of one of said runners, a second blade diverging outwardly from the forward end of the other of said runners, said first blade being positioned exteriorly of said pair of runners and said second blade being positioned between said one and other runners, and means connecting each of said first and second blades to the adjacent runner for swinging movement from the position in which said first blade is exteriorly of said pair of runners and said second blade is between said one and other runners to a position in which said first blade is between said one and other runners and said second blade is exteriorly of said pair of runners.

3. In a plant bed shaper including a pair of horizontally disposed laterally spaced runners each having a bottom, said pair of runners having forward ends and rearward ends, the bottoms being adapted for sliding movement over a ground surface, a cross member connecting the forward ends of said runners together, and hitch means carried by said cross member for attachment to a towing vehicle, a first blade diverging outwardly from the forward end of one of said runners, a second blade diverging outwardly from the forward end of the other of said runners, said first blade being positioned exteriorly of said pair of runners and said second blade being positioned between said one and other runners, means connecting each of said first and second blades to the adjacent runner for swinging movement from the position in which said first blade is exteriorly of said pair of runners and said second blade is between said one and other runners to a position in which said first blade is between said one and other runners and said second blade is exteriorly of said pair of runners, and other means connecting said first and second blades for movement together.

4. In a plant bed shaper including a pair of horizontally disposed laterally spaced runners each having a bottom, the bottoms being adapted for sliding movement over a ground surface, a cross member connecting one of the adjacent ends of said runners together, and hitch means carried by said cross member for attachment to a towing vehicle, a first blade positioned adjacent one of said runners, a second blade positioned adjacent the other of said runners, said first blade being positioned exteriorly of said pair of runners and said second blade being positioned between said one and other runners, means connecting each of said first and second blades to the adjacent runner for swinging movement from the position in which said first blade is exteriorly of said pair of runners and said second blade is between said one and other runners to a position in which said first blade is between said one and other runners and said second blade is exteriorly of said pair of runners, hand actuable means operatively connected to said first and second blades for affecting their simultaneous movement, and means carried by each of said blades for releasably retaining a planting device in erect condition on the ridge portion of a plant bed when said blades are in either of the aforesaid positions.

References Cited in the file of this patent
UNITED STATES PATENTS
2,649,793     Draves _____ Aug. 25, 1953